United States Patent [19]

Frémy

[11] 4,376,525
[45] Mar. 15, 1983

[54] COUPLINGS FOR FLEXIBLE CONDUITS AND THE LIKE

[76] Inventor: Raoul Frémy, 1, rue des Iris, 91540 Mennecy, France

[21] Appl. No.: 169,621

[22] Filed: Jul. 16, 1980

[30] Foreign Application Priority Data

Jul. 25, 1979 [FR] France .............................. 79 19168
Jun. 6, 1980 [FR] France .............................. 80 12620

[51] Int. Cl.³ ............................................ F16L 37/28
[52] U.S. Cl. .............................. 251/149.6; 285/316; 285/321
[58] Field of Search ............... 285/313, 316, 317, 318, 285/321; 251/149.6

[56] References Cited

U.S. PATENT DOCUMENTS

| | | | |
|---|---|---|---|
| 2,673,750 | 3/1954 | Scheiwer | 285/313 X |
| 2,951,713 | 9/1960 | Hoffstrom | 285/317 |
| 3,039,794 | 6/1962 | DeCenzo | 285/317 |
| 3,167,331 | 1/1965 | Marshall | 285/321 X |
| 3,439,944 | 4/1969 | Leutenegger | 285/321 |
| 3,456,963 | 7/1969 | Dillon | 285/321 X |
| 3,532,101 | 10/1970 | Snyder, Jr. | 285/318 X |
| 3,997,196 | 12/1976 | Karcher et al. | 285/316 |

FOREIGN PATENT DOCUMENTS 1277984 10/1961 France .............................. 285/318
1486149 5/1967 France .
349461 11/1960 Switzerland .

Primary Examiner—A. Michael Chambers
Attorney, Agent, or Firm—Young & Thompson

[57] ABSTRACT

A coupling for flexible conduits in which the female element is constituted by a body 1 provided with an axial bore comprising internally a locking recess 2 and the male element is constituted by a tip on which is mounted a locking device constituted by an engagement element radially displaceable to engage in the locking recess of the female element under the action of a locking control device 13 constituted by a sleeve mounted longitudinally movably on the cylindrical central body of the male element, the end of said sleeve directed toward the engagement end of the male element forming a cam surface 14 coacting with the engagement element so as to displace it radially outwardly and this sleeve being resiliently urged by a spring 17 toward the locking position. A peripheral ring 18 is slidably mounted on the periphery of the male element so as, in the uncoupled position of the coupling, to come into engagement over the engagement element to maintain it in its retracted position toward the interior of the body of the male element.

9 Claims, 18 Drawing Figures

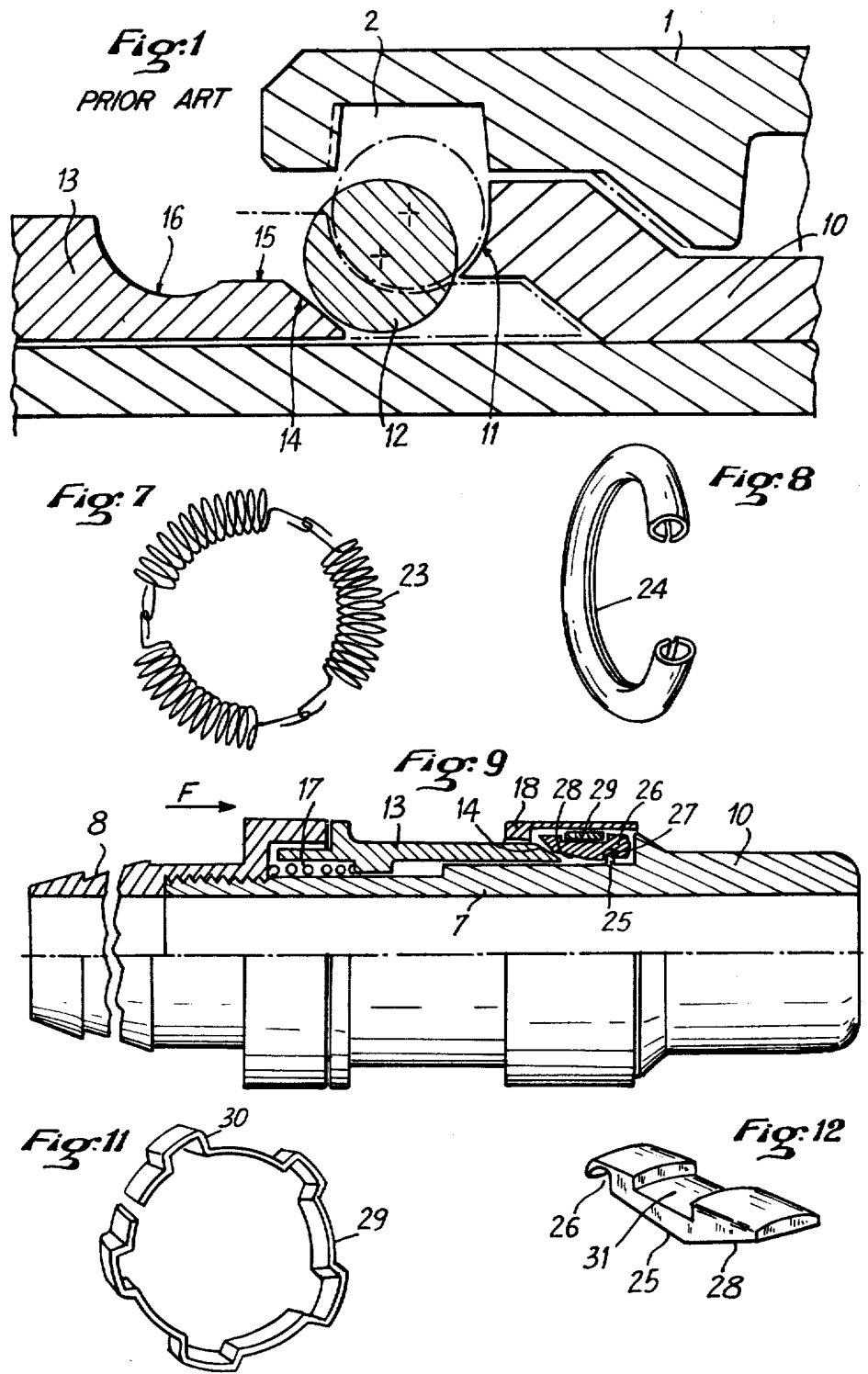

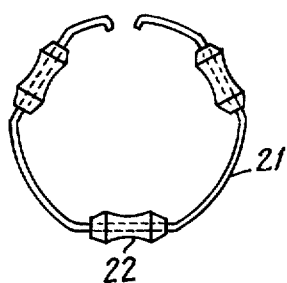
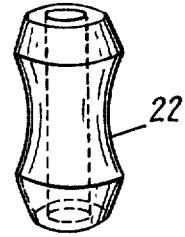
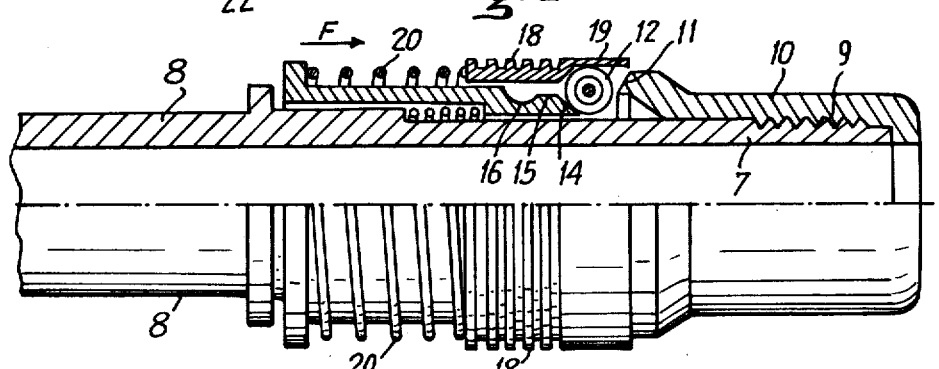
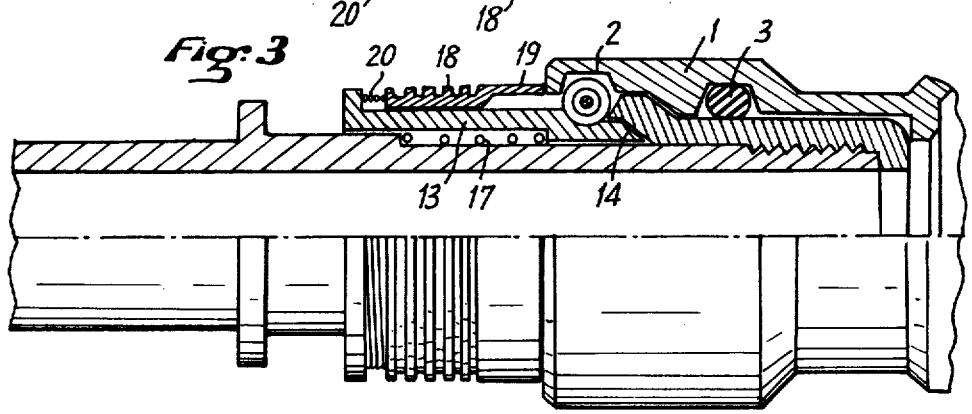
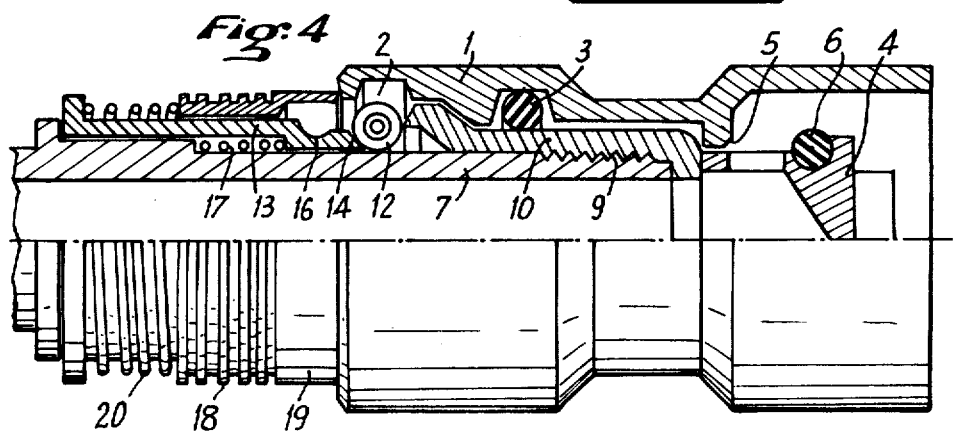

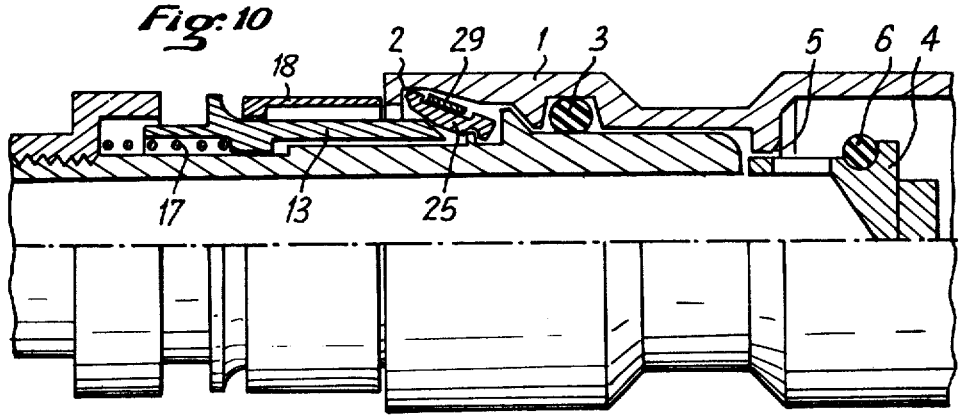
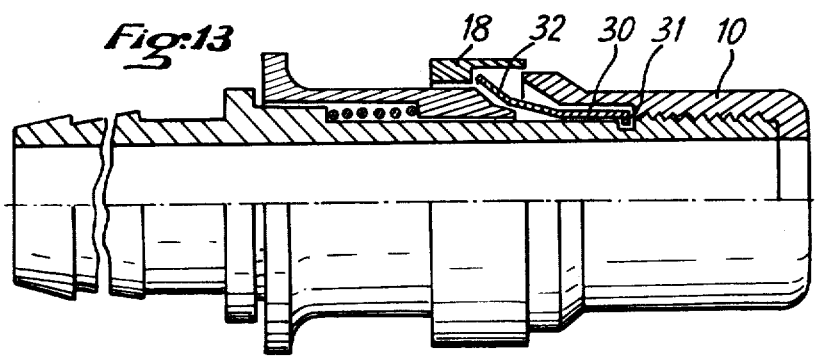
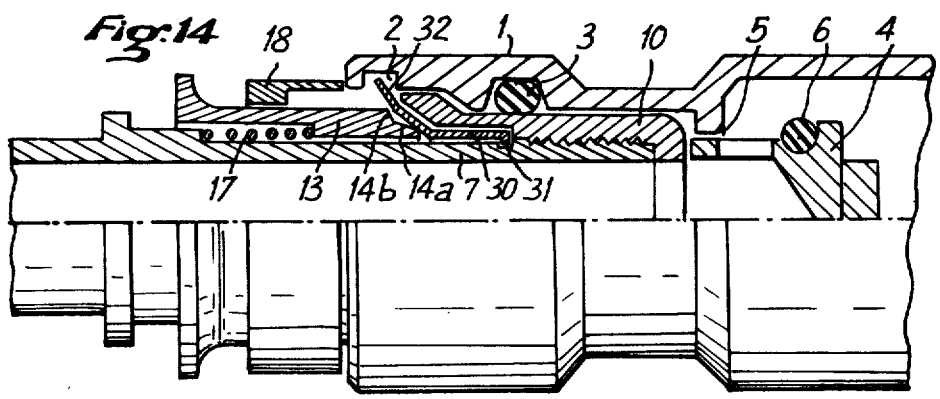
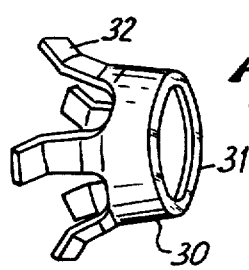

COUPLINGS FOR FLEXIBLE CONDUITS AND THE LIKE

The present invention relates to a coupling for the connection of flexible conduits or the like with each other or to rigid conduits and more particularly a so-called quick coupling of the type constituted by a male element adapted to have locking engagement with the interior of a corresponding female element.

A coupling of this type has been described in U.S. Pat. No. 3,997,196 in the name of Karcher. In this known coupling, the female element is constituted by a body provided with an axial bore comprising internally a peripheral locking recess and the male element is constituted by a tip on which is mounted a locking device adapted to engage within the axial bore of the female element, said locking device being constituted by an engagement element radially displaceable to come into engagement in the locking recess provided in the axial bore of the female element and by a locking control device controlling the outward radial displacement of the engagement element toward its locking position and adapted to be positively brought into an unlocking position permitting the disengagement of the engagement element from the recess of the female element. In this coupling, the locking control device is constituted by a sleeve mounted for longitudinal movement on the central cylindrical body of the male element, the end of said sleeve directed toward the engagement end of the male element providing a cam surface cooperating with the engagement element so as to displace it radially outwardly. This sleeve constituting the locking control element is elastically urged by a spring toward the locking position in which it urges the engagement element back radially outwardly.

In the coupling of this type previously described in U.S. Pat. No. 3,997,196 it is necessary to maintain, in the uncoupled condition of the coupling, the engagement element in the unlocked position against the elastic pressure of the spring which urges the sleeve comprising the control device back toward the projecting position of the engagement element. In this patent, this is achieved by an immobilization device maintaining the sleeve in its spaced position, the engagement element itself having an elasticity which urges it toward its disengagement position.

The drawbacks of this coupling are that, in order to couple, it is necessary to press the male element into the female element and to release the sleeve comprising the control device; and to uncouple, it is necessary to actuate the immobilization device to maintain the sleeve in its retracted position, the two operations including two manipulations which are difficult to perform simultaneously. Moreover, in the uncoupled condition, the engagement element is exposed and is susceptible to be soiled or jammed in position by dirt, grit or the like.

The present invention has for its object the provision of a coupling of the above type in which coupling is effected by a simple longitudinal engagement force exerted on the male and female elements and uncoupling by a simple pull exerted between the female element and a peripheral member of the male element.

It also has for its object the provision of a coupling of this type in which the mechanical means ensuring locking and the sealed joints are protected against dirt, grit and other foreign bodies, in the uncoupled condition of the coupling.

It also has for its object the provision of a coupling of this type in which the engagement element is, in a manner known for other types of couplings, constituted by a series of lugs or analogous elements mounted freely radially in radial seats in the body of the male element.

These objects are achieved according to the invention by the fact that a peripheral so-called "release" ring is slidably mounted on the periphery of the male element so as, in the uncoupled position of the coupling, to engage over the disengagement element to maintain it in its retracted position within the body of the male element.

In the course of the coupling operation the release ring is urged back by the free end of the female element, the disengagement element penetrating the bore of the female element and being pushed back radially by the engagement control sleeve, to engage in the locking recess of the female element when it is disposed opposite the latter. The coupling operation is thus effected by a simple longitudinal engagement pressure.

According to another characteristic of the invention and to obtain automatic locking in the uncoupled position, the release ring is elastically urged toward its engagement position over the disengagement element. With this feature the uncoupling takes place simply by exerting traction between the female element and the sleeve comprising the locking control element, the release ring automatically following the end face of the female element during its retraction to move back over the engagement element.

According to another characteristic, the end of the release ring is so formed as to cooperate with the locking element to push it back toward its unlocking position. The locking element may to this end be constituted in known manner by lugs or pins with a hemispherical head whose centrifugal displacement into their engagement fast with the male element under the action of the control device, is limited by an abutment.

According to a second embodiment, the engagement element is constituted by at least one stop movably mounted at one of its ends about a transverse axis and whose other end is bevelled to cooperate with the cam surface of the sleeve, the stop or stops being maintained in position by means of a spring ring.

According to still another embodiment, the engagement element is constituted by a spring ring provided on its periphery with abutment elements such as balls, rollers or the like, the cam surface of the control sleeve engaging inside said spring ring to move the elements to projecting position.

According to another characteristic the element elastically urging the release ring toward its engagement position is constituted by a compression spring disposed in a cylindrical recess of the control device, a recess in which may engage at least partially the release ring when it is pressed back by the engagement of the female element with the male element.

The spring force pressing back the release ring is less than that urging the control device toward the locking position. This arrangement protects the return spring of the release ring against becoming blocked with dirt or the like.

According to still another characteristic the control device comprises blocking means in the locking position. This blocking means is constituted preferably by a lug projecting from the peripheral surface of the fixed portion of the male element, a lug which cooperates to provide an abutment with the rear face of the sleeve of the control device and which, for a predetermined orientation of this latter, engages in a longitudinal groove of the latter.

The present invention also has for an object the provision of an automatic shut-off quick coupling in which the mechanical part of the locking device is provided in the male element and the valve device for automatic shut-off, in the female element.

According to one embodiment, fluidtightness between the female element and the male element is ensured by an O-ring disposed in the female element and bearing against the peripheral surface of the nose of the male element which will push back the automatic valve disposed in the female element. The peripheral surface of the nose of the male element is however subject to scratching or soiling which can reduce fluidtightness. To correct this and according to another characteristic, the tubular body of the automatic valve is prolonged by a nose engaging the interior of the bore of the nose of the male element in the interior of which is disposed an O-ring and an O-ring mounted on the periphery of the tubular body of the valve cooperates in the coupled positions of the coupling with an internal cylindrical bearing surface of the female element.

Other characteristics and advantages of the present invention will become apparent from a reading of the detailed description of several embodiments of the coupling according thereto given hereafter with reference to the accompanying drawings, in which:

FIG. 1 shows schematically the operation of the locking device of a coupling of known type according to the prior art;

FIG. 2 is a view half in elevation and half in longitudinal section of a first embodiment of the male element of a coupling according to the present invention;

FIG. 3 is a view corresponding to FIG. 2 with the female element locked to the male element;

FIG. 4 is a view corresponding to FIG. 2 at the time of unlocking the coupling;

FIG. 5 is a detail view showing a first embodiment of the elastic ring which constitutes an element of the coupling according to FIGS. 2-4;

FIG. 6 is a detail perspective view of a roller of the elastic ring of FIG. 5;

FIG. 7 is an elevational view of a second embodiment of the elastic ring;

FIG. 8 shows in perspective a third embodiment of said elastic ring;

FIG. 9 is a view corresponding to FIG. 2 of a second embodiment of the coupling;

FIG. 10 is a view similar to FIG. 4 showing the male element of FIG. 9 in the locked condition with the corresponding female element;

FIG. 11 is a perspective view of the elastic ring which, in the embodiment of FIGS. 9 and 10, elastically returns the lugs to the unlocked position;

FIG. 12 is a perspective view of one of the locking lugs of the coupling according to FIGS. 9 and 10;

FIG. 13 is a view corresponding to FIG. 2 of a third embodiment of the coupling;

FIG. 14 is a view similar to FIG. 4 showing the male element of FIG. 13 in the locked condition with the corresponding female element;

FIG. 15 is a perspective view of the locking element of the coupling of FIGS. 13 and 14;

Figure 16:
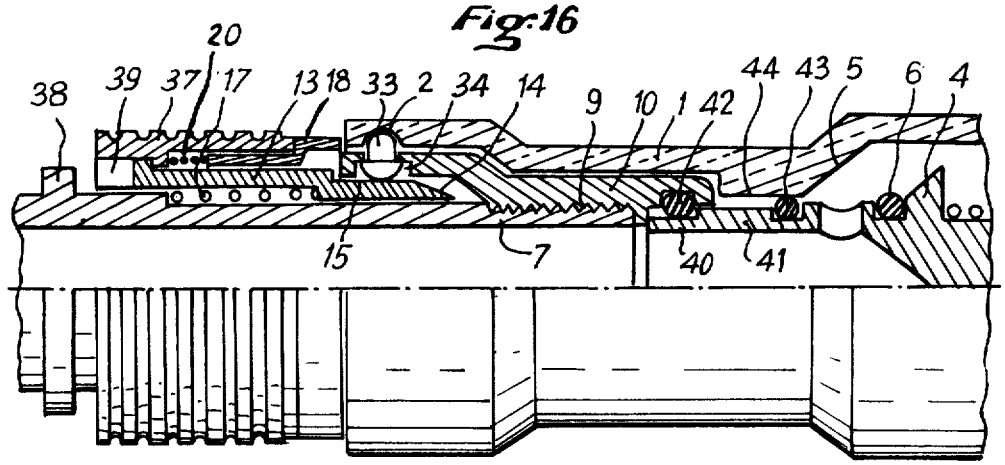
FIG. 16 is a view half in elevation and half in longitudinal section of a coupling according to a fourth embodiment in the coupled condition.

In the figures collectively the same elements or equivalent elements are designated by the same reference numerals. Reference numeral 1 designates in its entirety the female element of the coupling, 2 the recess provided in the internal bore of the female element, 3 the O-ring provided in the same bore to cooperate with the cylindrical bearing of nose of the male element, 4 the obturation valve mounted in the female element which is raised from its seat 5 by the pressure of the male element, and 6 the O-ring of the obturation valve. In the male element reference 7 designates the tubular body of the element which comprises at its rear portion an elongation 8 or the like for connection with a flexible conduit. On tubular body 7 is connected and for example fixed by threads 9, a nose 10 which forms the cylindrical bearing with which the O-ring 3 cooperates but which also constitutes an abutment 11 for the locking means.

In FIG. 1 which illustrates the prior art there are shown certain of the elements described above. The locking means 12 is constituted by an element of circular section, for example a ring, on the tubular body 7 between the abutment 11 of nose 10 and a sleeve 13 which is longitudinally movable on the tubular body 7. This ring 12 has an elasticity which tends to bring it to bear against the peripheral surface of body 7. The end 14 of sleeve 13 is of truncated conical form, the leading edge of this part being designed to engage under elastic ring 12, maintained by abutment 11, to stretch it. The truncated conical portion 14 is followed by a cylindrical portion 15 which ends in a recess 16. The external and internal diameters and the diameter of the section of ring 12 are such that when it is brought to bear against tubular body 7 as shown in full line in FIG. 1, the ring will not project relative to the male element and may be engaged in the bore of the female element. By contrast, when the ring 12 is engaged in recess 16, its stretched external diameter is greater than that of the internal bore of the female element 1 and if, as shown in broken line, it is stretched to the right of locking throat 2, it will project into this recess to lock the female and male elements of the coupling. To close the coupling, the female part 1 is engaged on the male part and one exerts on sleeve 13 a pressure in the direction of arrow F, so as to engage the truncated portion 14 under ring 12 which is in abutment against abutment 11 of nose 10. Ring 12 stretches and engages in the recess 2 until its stretched internal diameter permits it to pass over bearing 15. When it reaches the right of the recess 16, the ring contracts slightly while remaining engaged in locking recess 2 of female element 1. Forces tending to disengage the male element from female element 1, particularly internal pressure in the passageway, are transmitted from the outer edge of recess 2 to the abutment surface 11 of nose 10 of the male element by ring 12. To uncouple the coupling, one displaces sleeve 13 relative to tubular body 7 and to nose 10 in the opposite direction from arrow F so as first to stretch ring 12 to make it pass over bearing 15, said ring 12 then contracting and disengaging from recess 2. It will be noted that the elastic ring 12 coacts with recess 16 to provide a locking, in the locked position of the coupling, of the sleeve 13 which constitutes the locking control means.

The coupling described in connection with FIG. 1 is of a known type. It has the drawback of requiring positive action on the sleeve. The present invention has for an object to provide according to the same principle a coupling which couples automatically. Such a coupling is shown in FIGS. 2-4 in which the same elements are designated by the same reference numerals. In contrast to the embodiment of FIG. 1, a helical spring 17 disposed between the tubular body 7 and the sleeve 13 acts between two shoulders of these two members to urge the sleeve 13 in the direction of arrow F with a force sufficient to stretch elastic ring 12 in abutment against abutment 11 of nose 10 so as to make ring 12 pass over the truncated conical portion 14 and the bearing 15 until it reaches the recess 16. It is accordingly not necessary to exert the force F manually to effect locking. However when the male element is uncoupled, spring 17 would force ring 12 into recess 16, a position in which it is not possible to engage the female element onto the male element. To overcome this it is necessary to provide a release which nullifies the action of spring 17 during uncoupling. This release is provided by a sleeve 18 slidably mounted on sleeve 13, sleeve 18 having a portion 19 which encircles ring 12 to prevent its expansion. Sleeve 18 may be manually urged, during uncoupling, to the left as seen in FIG. 4, in opposition to the force exerted on sleeve 13, after which sleeve 18 will follow female portion 1 in its disengagement movement until it reaches the position shown in FIG. 2. This displacement following female portion 1 is preferably automatically effected by a spring 20 acting between sleeve 18 and a shoulder of sleeve 13. During coupling the end face of the female element bears against the end face of sleeve 18 to press back the latter against the action of spring 20 until ring 12 engages in the bore of the female element and comes into engagement, under the pressure of spring 17 acting through the truncated conical surface 14 of sleeve 13, into recess 2 of female element 1.

Ring 12 may, as shown in FIG. 5, be comprised by a resilient ring 21 on which are threaded balls or diabolos 22 such as that shown in FIG. 6. This ring 12 may also be constituted by a helical spring or, as shown in FIG. 7, by three small springs 23 or as shown in FIG. 8 by a torical split ring 24.

In the embodiment shown in FIGS. 9-12 the locking element of the coupling is constituted by a certain number (five in the present case) of pawls 25 (FIG. 12) of generally parallellepipedal flat form of which one end has a recess 26 to engage on a rib 27 of tubular body 7 of the male element to form a sort of hinge articulation while the other end is bevelled at 28 to cooperate with the truncated conical surface 14 of sleeve 13. The pawls 25 are maintained resiliently gripped on the periphery of body 7 by a ring 29 shown in FIG. 11, which comprises bridge sections 30 equally angularly spaced and adapted to engage each in a recess 31 provided on the external face of each pawl 25 to maintain said pawls in position. Sleeve 13 is also urged in the direction of arrow F by spring 17 and a release ring 18 is slidably mounted on the periphery of sleeve 13. It is however to be noted that in this embodiment, the pawls 25, in contrast to ring 12, are not held in the open position by means analogous to recess 16 and that it suffices to press back sleeve 13 against the force of spring 17 so that pawls 25 will return to their unlocked position shown in FIG. 9. In this embodiment the nose 10 is provided integral and machined from body 7 and it is projection 8 which is secured by threading to the body 7 of the male element.

The embodiment of FIGS. 13-15 is analogous to the preceding embodiments but the locking element is constituted in known manner by a ring with resilient fingers shown in perspective in FIG. 15. This ring comprises a tubular body 30 terminating at one end in an internal flange 31 which is retained in assembled relation in the joint between body 7 and nose 10. At its other end body 30 is prolonged by flat fingers 32 which flare out along two successive truncated cones. The end 14 of sliding sleeve 13 engages under these arms, this end 14 being constituted by two truncated conical surfaces 14a, 14b which press back the fingers 32 against the bearing surface of nose 10 that corresponds to bearing 11 in FIG. 1 and resiliently deform them such that they protrude into engagement in recess 2 of the female element as shown in FIG. 14. When the sleeve 13 is disengaged to the left in FIG. 14, against the action of spring 17, the fingers 32 return to their covered position and the coupling may be uncoupled. In this embodiment also a release sleeve 18 prevents fingers 32 from spreading under the action of sleeve 13 urged by spring 17.

Figure 17:
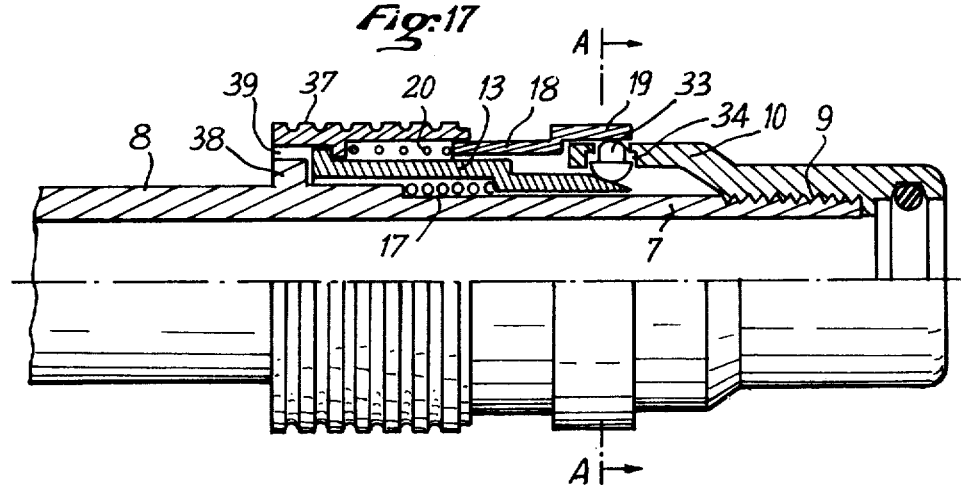
FIG. 17 is a view corresponding to the male element of the coupling of FIG. 16.
Figure 18:
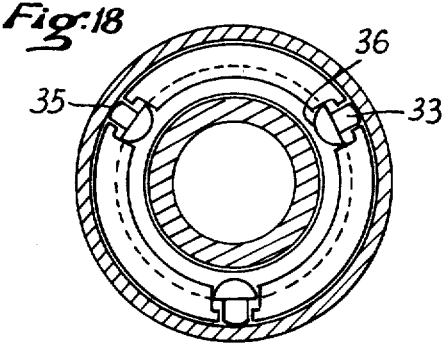
FIG. 18 is a sectional view on the line A—A of FIG. 17.

In the embodiment of FIGS. 16-18, the detent element is constituted by a plurality of balls (not shown) or movable pins 33 disposed in seats 34 of nose 10. Each seat 34 is such that the ball or pin 33 may move between a position in which it bears against the cylindrical portion 15 of sleeve 13 and projects from the periphery of nose 10 to engage in recess 2 of the female portion of the coupling and a position in which it is within the interior of nose 10. In the pin 33, the portion 35 which projects has a hemispherical end and the lower portion 36 is also a spherical section or the like so that the former can coact with the forward edge of end 19 of the release ring to press back the pin 33 in a radially inward direction, and that pins 33, by coacting with the truncated conical end 14 of sleeve 13, may be pushed back outwardly to ensure detention. In the case of balls, the necessary shapes are provided by the sphericity of the balls.

The projection of the pins 33 or of the balls is limited either by a scarp provided in the seat 34, or, in a known manner, by a seat on the outer edge of the bore constituting seat 34. In this embodiment a sleeve 37, grooved or knurled, slides on the outside of ring 18 to enclose spring 20; and this sleeve 37 is fixed for movement with sleeve 13 at least in the unlocking direction. The end of the female element comes, during unlocking, into abutment against the end face of the ring 18 and pushes it back against the action of spring 20.

According to another feature a lug 38 projects from the cylindrical peripheral portion of body 7 of the male element and comes into abutment with the rear face of sleeve 13, to block the latter against the unlocking action described above, or opposite a longitudinal channel 39 provided in the sleeve 13 to permit this unlocking.

For unlocking, the lug 38 being opposite channel 39, one exerts a separating force corresponding to the force of spring 17 between sleeve 37 and female element 1. The pins 33 coming opposite the truncated conical portion 14 are pressed back toward the interior by the shape of recess 2 and the male element leaves the female element, the ring 18 pressed by spring 20 following the female element to come into engagement over pins 33, to maintain them in the unlocking position as shown in FIG. 17. For locking it suffices to engage the female element onto the male element and to push back ring 18 against the action of spring 20. As soon as pins 33 come opposite recess 2, they are pressed back by the incline 14 and the sleeve 13 automatically comes into unlocking position under the pressure of spring 17.

Fluidtightness between the male element and the female element is ensured by a nose 40 at the end of tubular body 41 of valve 4, this nose penetrating into a secondary bore of nose 10 of the male element, there being an O-ring 42 disposed in this secondary bore. A second O-ring 43 on the outside of tubular body 41 of valve 4 coacts with an internal cylindrical bearing surface 44 of the female element.

What is claimed is:

1. In a coupling for flexible conduits and the like comprising a female element comprising a body having an axial bore having internally a peripheral locking recess, and a male element comprising a tip on which is mounted a locking device adapted to engage in the axial bore of the female element, said locking device comprising an engagement element radially displaceable to come into engagement in the locking recess provided in the axial bore of the female element and a locking control device controlling the radially outward displacement of the engagement element toward its locking position and adapted to be brought positively into an unlocking position permitting disengagement of the engagement element from the recess of the female element, the locking control device comprising a sleeve mounted longitudinally movably on the male element, the end of said sleeve directed toward the engagement end of the male element having a cam surface coacting with the engagement element so as to displace the engagement element radially outwardly, and a spring resiliently urging said sleeve toward the locking position in which said sleeve presses the engagement element radially outwardly; the improvement comprising a release ring slidably mounted on the periphery of the locking control device so as, in an uncoupled condition of the coupling, to come into engagement over the engagement element to keep the engagement element in its retracted position toward the interior of the body of the male element, the release ring and the body of the female element having interengageable portions such that, during coupling, the body of the female element contacts the release ring and moves it back out of engagement from over the engagement element thereby permitting the engagement element to move radially outward into the locking position in the locking recess of the female element.

2. A coupling according to claim 1, and means resiliently urging the release ring toward its engagement position over the engagement element.

3. A coupling according to claim 2, in which the means resiliently urging the release ring toward its engagement position comprises a compression spring disposed in a cylindrical recess on the periphery of the sleeve, the release ring being adapted to engage at least partially in said recess when it is pushed back by the engagement of the female element on the male element.

4. A coupling according to claim 1, in which the end of the release ring is so shaped as to coact with the engagement element to press it back toward its unlocked position.

5. A coupling according to claim 4, in which the engagement element is constituted by elements with hemispherical heads whose outward displacement in seats integral with the male element under the action of the control device, is limited by an abutment.

6. A coupling according to claim 1, in which the engagement element comprises at least one lug movably mounted at one end of its ends about a transverse axis and whose other end is bevelled to cooperate with the cam surface of the sleeve, said at least one lug being maintained in position by means of a spring ring.

7. A coupling according to claim 1, in which the control device comprises blocking means in the locking position.

8. A coupling according to claim 7, in which the blocking means is a lug projecting from the peripheral surface of the male element, said lug coacting to provide an abutment with the rear face of the sleeve of the control device and which, for a predetermined position of the latter, engages in a longitudinal channel of the latter.

9. A coupling according to claim 1 of the automatic valve type comprising a closing valve device in the female element, in which the automatic valve has a tubular body which is elongated by a nose engaging in the interior of the bore of the nose of the male element in the interior of which is disposed an O-ring seal, and an O-ring seal mounted on the periphery of the tubular body of the valve that coacts in the coupled position of the coupling with an internal cylindrical bearing surface of the female element.

* * * * *